July 13, 1965 W. T. HONISS 3,193,926
BLADES FOR MOLTEN GLASS CUTTERS
Filed April 17, 1963
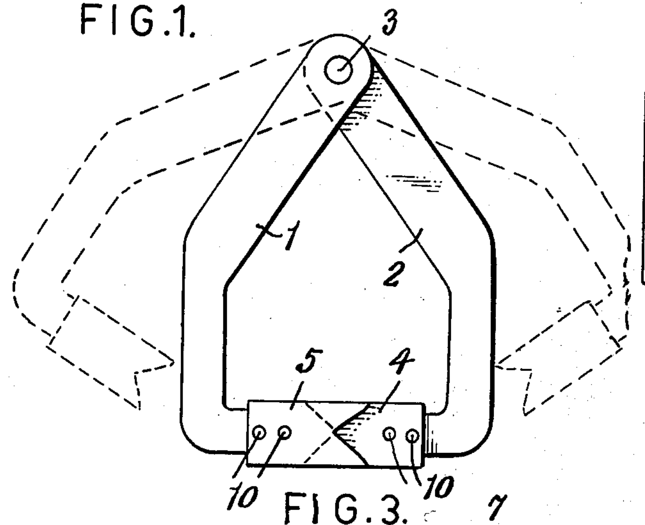
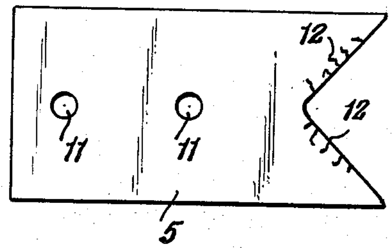
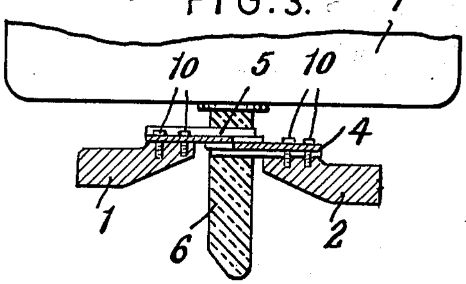
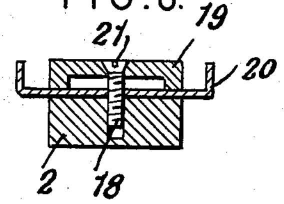
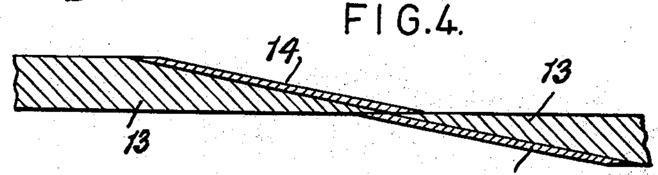
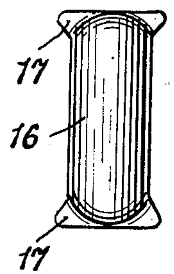
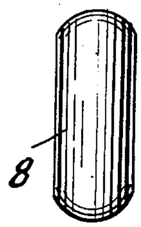
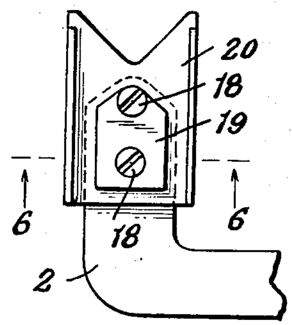
INVENTOR.
William T. Honiss
BY
Erwin Q. Yaeger
Attorney United States Patent Office 3,193,926

Patented July 13, 1965

3,193,926

BLADES FOR MOLTEN GLASS CUTTERS

William T. Honiss, 51 Fernwood Road, West Hartford, Conn.

Filed Apr. 17, 1963, Ser. No. 273,616
4 Claims. (Cl. 30—350)

This invention relates to means for cutting molten glass and more particularly to the opposing cutter blades between which a stream of the glass flows from a feeder or other source of supply and which glass is severed into suitable lengths by the blades.

In feeding molten glass charges to a forming machine for the manufacture of glass containers and the like, it is necessary to shear successive charges from a stream of the molten glass issuing from a feeder orifice or from a pool from which the charges are drawn by suction. It is customary to carry out this charge-severing step in the gob fed process, for example, by the use of a pair of opposing cutter blades driven into and out of shearing relationship by mechanical, pneumatic or hydraulic means. The temperature of the glass stream is in the order of 1800 to 2300 degrees Fahrenheit and it has been customary to use so-called "high speed" steel as the material for the cutters since this metal preserves its hardness at temperatures substantially higher than that of carbon steels. In the normal manufacture of glass container ware, for example, shearing frequencies are quite high, such as of the order of 30 to 100 strokes per minute. In spite of the relatively high drawing temperature of high speed steel i.e. approximately 1600 degrees F. it is necessary to apply a spray of water solution on the cutters in order to keep them below the temperature at which the shearing edges will stick to the glass and have their hardness drawn. The latter condition would require shutting down the feeder in order to replace the cutters with attendant loss of production.

The high frequency of alternate heating and chilling of the cutters where they are very thin at the edges ultimately results in fatigue heat checking of the metal and splintered cutting edges. These splinters and cracks cause "shear scars" or tears in the mold charges which show up in the final product. The damaged cutters usually cannot be successfully salvaged as it is not ordinarily economical to eliminate the cracks in the blades by regrinding.

Blades have been designed in an effort to minimize the fatigue heat checking by making the shearing edge, known as the "impact edge" relatively blunt, but such design introduces a different type of defect in the end product by producing "dog ears" or "pillow ends" in the mold charges. This configuration at the ends of the mold charges results in laps otherwise known as "inclusions" in the finished product. The ideal cut-off is symmetrical and without the irregular ends above described.

It is an object of the invention to provide a cutter blade composed of certain other materials than high speed steel to thereby minimize fatigue heat checking, and provided with a sharp, thin impact face to avoid causing "pillow ends" on the mold charge.

With these and other objects to be hereinafter set forth in view, I have devised the arrangement of parts to be described and more particularly pointed out in the claims appended hereto.

In the accompanying drawing, wherein an illustrative embodiment of the invention is shown, FIG. 1 shows a cutting apparatus to which blades of the present invention are applicable;

FIG. 2 shows a blade of the conventional type, showing how the impact edge becomes cracked or splintered after some use;

FIG. 3 is a transverse sectional view of the parts shown in FIG. 1;

FIG. 4 is an enlarged sectional view of the improved cutter blades adjacent to the impact edges thereof;

FIG. 5 is a plan view of one of the blades mounted on a cutter arm;

FIG. 6 is a sectional view, taken substantially on the line 6—6 of FIG. 5, looking in the direction of the arrows;

FIG. 7 is a view of a cut-off charge of glass, showing how the same becomes provided with distorted or "pillow ends" when severed by blunt cutter blades, and FIG. 8 shows a symmetrical cut-off charge of the glass as produced by the improved blades.

Referring to the drawing, 1 and 2 indicates the shear arms of a conventional cutting apparatus, said arms being pivotally connected at 3, and adapted by suitable known means to be moved toward and away from one another to bring the blades 4 and 5 respectively carried by the arms into overlapping cutting relationship and then separate them. The stream of molten glass is shown at 6, the same being fed between the blades from a feeder or source of supply by suitable known means and the glass is severed in suitable lengths, such as is indicated at 8 in FIG. 8. Each of the blades 4 and 5 is suitably secured to the end of the arm which carries it, by means of the screws indicated at 10, the same being extended through the holes 11 in the blade. After a blade of known construction, and such as shown in FIG. 2, has been in use, splintered cutting edges, as shown at 12, soon result and the blade must be replaced.

The present invention contemplates the use of blades constructed according to FIG. 4, each of which blades is of bi-metallic structure. The main body of each blade, shown at 13 is a metal characterized by high thermal conductivity and specific heat compared to high speed steel, although it may not be as good as the latter as far as resistance to wear is concerned. Beryllium copper has the required characteristics and is an example of a metal which can be satsfactorily used. The composition of such metal is approximately 2% beryllium, .2 cobalt and the remainder copper. It is preferably heat treated to the maximum hardness permitted by subsequent forming operations needed to produce the cutter blade.

The laminate shown at 14 on each of the blades is relatively thin and is composed of a completely different metal and one which is highly resistant to wear. Such an alloy could be of approximate composition 15% cobalt with the remainder of tungsten carbide and such metal is obtainable from the Linde Division of Union Carbide Co. under their specification "LWIN." This laminate is of approximately .0015 in thickness and is bonded to and backed by the main body 13. The bonding is preferably done by a fusion spray process which may be obtained by the suppliers of the tungsten carbide material.

Each of the blades 13 has one of its faces inclined at one end to terminate in a relatively sharp edge, and the laminate 14 is deposited over said inclined surface and projects forward beyond said sharp edge to an extent to form a cutting edge on the laminate. In their operative position, the blades appear as shown in FIG. 4 wherein it will be seen that the sliding contact between the blades takes place between the faces thereof which are opposite to those having the inclinations so that the parts of the laminate which contact during the cutting operation are those parts of the laminate which extend beyond the forward edges of the blades.

The advantage of this particular bi-metallic blade construction will be apparent from the foregoing explanation. Since the backing material 13 forming the major portion of the blade is intimately bonded with the laminate 14 and is of high thermal conductivity and specific heat, it rapidly withdraws heat from the thin cutting edge formed of the material 14 during contact with the molten glass and dissipates this heat efficiently to the cooling water spray during the retracted intervals of the shearing operations. Due to the temperature stabilizing or "flywheel" action of the backing material 13 on the carbide laminate 14, fatigue effect of frequent alternate and drastic temperature changes from contact of the cutting edge with the molten glass and water spray is minimized. Cracking and subsequent ruining of the cutting edge of the blade is reduced so that more production time is gained.

At 16 in FIG. 7 is shown a length of the glass as it appears when severed by blunt edge blades, and a desirable and normal length of the glass is shown at 8 in FIG. 8. Due to the rapid and efficient extraction of heat from the thin cutting edge of the improved blade, the impact surface of the blade may be made at a smaller angle to the plane of severing and the pushing action causing the "pillow" ends 17 on the mold charge is thereby reduced.

Increased wear resistant properties of the laminate 14 over the backing material 13 maintains a sharp cutting edge in spite of some erosion of the material 13. In this way the cutter has a self-sharpening characteristic.

Normally, each conventional high speed steel blade, such as shown in FIG. 1, is secured to its shearing arm by means of two screws 10 which may be of the hexagonal head type. The clamping action between the blade and the arm is thereby localized in the area of the blade under the screw heads. Materials possessing high thermal conductivity and specific heat such as beryllium copper proposed as a component of the improved blade may be lower in modulus of elasticity than the high speed steel of the conventional blade. When using the new beryllium copper-backed blade therefore, it is desirable to increase stiffness so as to maintain tension between the opposing blades during the glass severing action. This can be done by interposing a hollow collar or spacer between the screws 18 and the improved blade 20 as shown in FIGS. 5 and 6. The hollow collar or spacer, indicated at 19 distributes the clamping action over a much larger blade surface and compensates for the lower modulus of elasticity of the beryllium copper in maintaining proper tension between the opposing blades when in contact with the glass. The screws can be provided with heads 21 of the bevel type in order to enable the blades to cut up close underneath the feeder orifice ring from which the glass stream emanates.

Having thus described a single embodiment of the invention, it is obvious that the same is not to be restricted thereto, but is broad enough to cover all structures coming within the scope of the annexed claims.

What I claim is:

1. A cutting blade for shearing charges of molten glass from a supply source, the blade having a body provided on one of its faces with an inclined surface tapering in a manner to terminate in a relatively sharp forward edge, a relatively thin laminate applied over said inclined surface and having a forward portion extending beyond the terminating edge of the blade, said laminate being provided on that surface of the blade which is away from the plane of severance by the blade, the laminate having high resistance to wear and the body of the blade having less resistance to wear but being of greater heat conductivity than the laminate and being thicker than the laminate.

2. A cutter blade for shearing charges of molten glass from a parent stream or supply pool, the blades being bimetallic and having a relatively thin laminate on the surface away from the plane of severing, said laminate being composed of a material having high resistance to wear to thereby maintain a sharp edge over long periods of operation; the thin laminate being intimately bonded to and backed by a relatively thicker component composed of beryllium copper characterized by materially greater thermal conductivity than that of the thin laminate so that the characteristics of said thicker component act to stabilize the temperature of the thin laminate between contact with the molten glass and the temperature-regulating water spray usually applied iin shear-retracted position, thus acting to avoid destructive fatigue heat checks on the cutting edge and to the production time that would be lost while changing blades.

3. A cutter blade according to claim 2, wherein the beryllium copper is composed of approximately 2% beryllium, 0.2% cobalt and the remainder copper.

4. A sheet metal shear blade assembly for co-acting with a similar, oppositely-disposed mating blade having a cutting edge at one end and means at the other end for clamping the blades to actuating arms, flanges at the sides of the blades to act as stiffeners between the two ends of the blades and with bridging washers to distribute the clamping action to the blade area around the stiffening flanges in order to better resist the tendency of the glass being sheared to wedge apart the cutting edges of the two mating blades, each of said washers consisting of a channel shaped member having side flanges connected by an integral face plate, said last-mentioned flanges having their edges disposed against and in contact with the blade, and the face plate constituting a bridge between said flanges and being disposed away from the blade, and fastening elements passing through the face plate of the washer between the flanges thereof and also passing through the blade and entering the arm on which the blade is mounted.

References Cited by the Examiner

UNITED STATES PATENTS

| | | | |
|---|---|---|---|
| 1,762,392 | 6/30 | Gray. | |
| 1,947,181 | 2/34 | Behrman | 30—349 X |
| 1,951,034 | 3/34 | Norton. | |
| 2,019,934 | 11/35 | Schroter et al. | |
| 2,146,697 | 2/39 | George | 85—50 X |
| 2,401,994 | 6/46 | Weber | 65—133 |
| 2,669,133 | 2/54 | Christensen. | |

FOREIGN PATENTS

| | | |
|---|---|---|
| 65,086 | 7/42 | Norway. |

WILLIAM FELDMAN, *Primary Examiner.*

MILTON S. MEHR, *Examiner.*